United States Patent
Yepez et al.

(10) Patent No.: US 8,204,622 B2
(45) Date of Patent: Jun. 19, 2012

(54) ENTERTAINMENT MEDIA RENTAL AND RETURN SYSTEM AND A REMOVABLE STORAGE BIN THEREFOR

(75) Inventors: Rafael Yepez, Duluth, GA (US); Jason A. Mastry, Cumming, GA (US)

(73) Assignee: NCR Corporation, Duluth, GA (US)

( * ) Notice: Subject to any disclaimer, the term of this patent is extended or adjusted under 35 U.S.C. 154(b) by 18 days.

(21) Appl. No.: 12/641,791

(22) Filed: Dec. 18, 2009

(65) Prior Publication Data

US 2011/0147400 A1 Jun. 23, 2011

(51) Int. Cl.
- G06F 17/00 (2006.01)
- B65D 83/08 (2006.01)
- B65H 39/00 (2006.01)

(52) U.S. Cl. .......... 700/242; 700/232; 221/282; 221/92
(58) Field of Classification Search .......... 700/242, 700/231, 232, 236, 237, 240–241, 243
See application file for complete search history.

(56) References Cited

U.S. PATENT DOCUMENTS

| | | | | |
|---|---|---|---|---|
| 4,812,629 A | * | 3/1989 | O'Neil et al. | 235/383 |
| 5,159,560 A | * | 10/1992 | Newell et al. | 700/215 |
| 6,201,474 B1 | * | 3/2001 | Brady et al. | 340/572.8 |
| 6,529,453 B1 | * | 3/2003 | Otsuka et al. | 369/30.32 |
| 7,747,346 B2 | * | 6/2010 | Lowe et al. | 700/242 |
| 7,853,354 B2 | * | 12/2010 | Kuehnrich et al. | 700/241 |
| 7,860,606 B2 | * | 12/2010 | Rudy | 700/242 |
| 2002/0046122 A1 | * | 4/2002 | Barber et al. | 705/17 |
| 2004/0254676 A1 | * | 12/2004 | Blust et al. | 700/231 |
| 2006/0259192 A1 | * | 11/2006 | Lowe et al. | 700/236 |
| 2006/0272922 A1 | * | 12/2006 | Hoersten et al. | 194/217 |
| 2009/0326708 A1 | * | 12/2009 | Rudy et al. | 700/234 |

* cited by examiner

Primary Examiner — Michael K Collins
(74) Attorney, Agent, or Firm — Paul W. Martin; Michael Chan

(57) ABSTRACT

An entertainment media rental and return system comprises a rental terminal at which a customer can either rent entertainment media or return entertainment media which has been previously rented from the rental terminal, a return terminal at which a customer can only return entertainment media which has been previously rented from the rental terminal, and a removable storage bin interchangeable between the terminals and arranged to (i) receive entertainment media which has been returned by a customer at the return terminal when the bin is installed in the return terminal, (ii) receive entertainment media which has been returned by a customer at the rental terminal when the bin is installed in the rental terminal, and (iii) provide entertainment media which is available to be rented to a customer at the rental terminal when the bin is installed in the rental terminal.

5 Claims, 12 Drawing Sheets

ENTERTAINMENT MEDIA RENTAL AND RETURN SYSTEM AND A REMOVABLE STORAGE BIN THEREFOR

BACKGROUND

The present invention relates to media on which entertainment data is stored, such as a digital versatile disc ("DVD"), and is particularly directed to an entertainment media rental and return system and a removable storage bin therefor.

A typical self-service media rental terminal for renting DVDs is capable of both dispensing a rented DVD to a customer and receiving a returned DVD from a customer. The self-service media rental terminal has a customer interface by which a customer interacts with the terminal to rent DVDs and return DVDs. A drawback in known self-service media rental terminals which are capable of both dispensing rented DVDs and receiving returned DVDs is that a customer who just wants to return a DVD has to wait in a queue with other customers who want to rent (or both rent and return) DVDs at the terminal. This wait in a queue may be quite frustrating for the customer who just wants to return a DVD, especially if the queue is relatively long. It would be desirable to provide an improved way for a customer who just wants to return a DVD.

SUMMARY

In accordance with one embodiment of the present invention, an entertainment media rental and return system comprises a rental terminal at which a customer can either rent entertainment media or return entertainment media which has been previously rented from the rental terminal, a return terminal at which a customer can only return entertainment media which has been previously rented from the rental terminal, and a removable storage bin interchangeable between the terminals and arranged to (i) receive entertainment media which has been returned by a customer at the return terminal when the bin is installed in the return terminal, (ii) receive entertainment media which has been returned by a customer at the rental terminal when the bin is installed in the rental terminal, and (iii) provide entertainment media which is available to be rented to a customer at the rental terminal when the bin is installed in the rental terminal.

DETAILED DESCRIPTION

The present invention relates to media on which entertainment data is stored, such as a digital versatile disc ("DVD"), and is particularly directed to an entertainment media rental and return system and a removable storage bin therefor.

Figure 1:
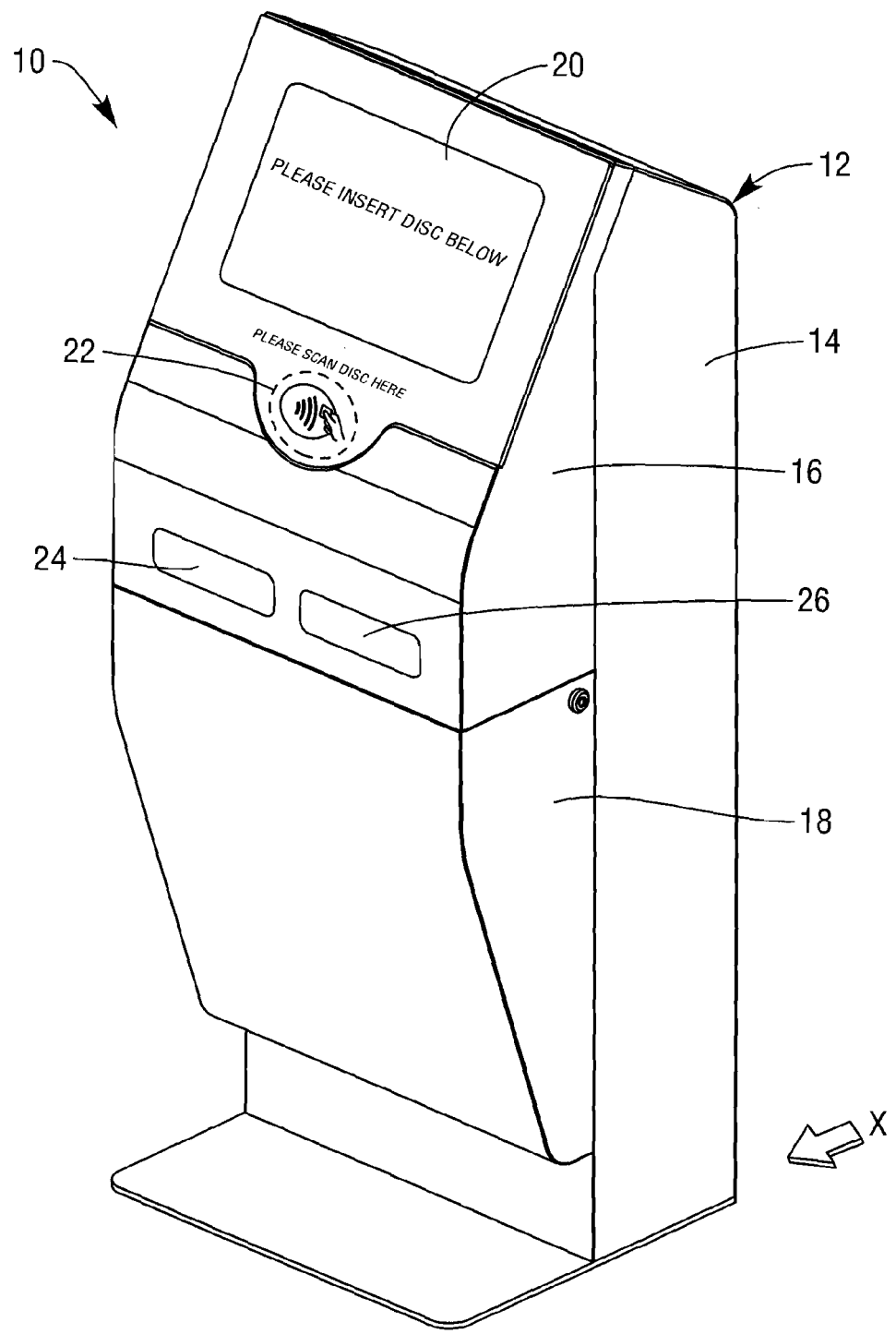
FIG. 1 is a right-front perspective view of a dedicated self-service return terminal for receiving a returned DVD on which entertainment data is stored, and which return terminal is constructed in accordance with one embodiment of the present invention.

Referring to FIG. 1, a dedicated self-service return terminal 10 constructed in accordance with one embodiment of the present invention is illustrated. The dedicated self-service return terminal 10 is capable of only receiving returned DVDs, and is not capable of dispensing DVDs. The self-service return terminal 10 comprises an exterior enclosure 12 which has a main panel 14 to which an upper customer interface panel 16 is fastened and to which a lower front access panel 18 is hingedly fastened. A first shutter mechanism has a first shutter door 24 movable between an open position and a closed position. Also, a second shutter mechanism has a second shutter door 26 movable between an open position and a closed position.

A backlit message display 20 is provided on the upper customer interface panel 16. The display 20 may be in the form of a liquid crystal display (LCD). The display 20 provides instructions for a customer desiring to return a DVD. As shown in FIG. 1, the display 20 is displaying an instruction line "PLEASE INSERT DISC BELOW". A radio frequency identification (RFID) reader 22 is also provided on the upper customer interface panel 16. The RFID reader 22 is located underneath the upper panel 16, and is therefore shown in dotted line. A fixed label marked "PLEASE SCAN DISC HERE" is adjacent to the RFID reader 22.

Figure 2:
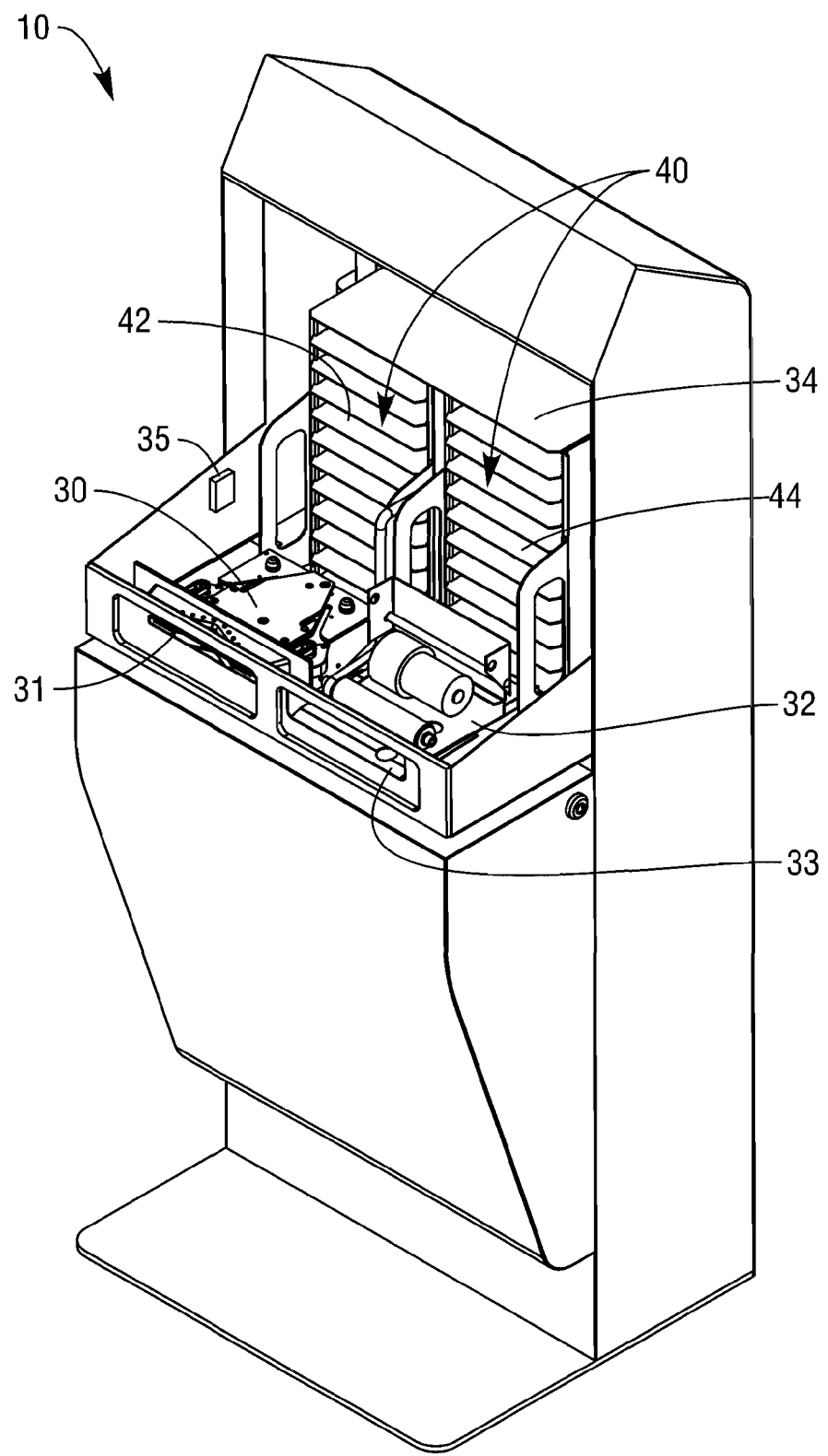
FIG. 2 is a perspective view similar to FIG. 1, and shows a back-lit message display removed to better illustrate certain internal components of the dedicated self-service return terminal.

Referring to FIG. 2, the display 20 of FIG. 1 is removed to better illustrate certain internal components of the dedicated self-service return terminal 10. A bare DVD transporter 30 has a first media return slot 31 which is aligned with the first shutter door 24 (FIG. 1) of the first shutter mechanism. A cased DVD transporter 32 has a second media return slot 33 which is aligned with the second shutter door 26 of the second shutter mechanism.

A controller 35 controls the first shutter mechanism to move the first shutter door 24 from the closed position to the opened position to allow a returned bare DVD (i.e., a DVD which is by itself without a case) to be inserted through the first media return slot 31 of the bare DVD transporter 30. When no bare DVD is being returned, the controller 35 maintains the first shutter door 24 in the closed position. The controller 35 also controls the second shutter mechanism to move the second shutter door 26 from the closed position to the open position to allow a returned cased DVD (i.e., a DVD which is in a DVD storage case) to be inserted through the second media return slot 33 of the cased DVD transporter 32. When no cased DVD is being returned, the controller 35 maintains the second shutter door 26 in the closed position. The controller 35 may comprise an electronic processor, a microcomputer, or the like. Such devices are known and, therefore, will not be described further.

When a customer desires to return a bare DVD, the first shutter door 24 opens and the customer inserts the bare DVD through the first media return slot 31. When a customer desires to return a cased DVD, the second shutter door 26 opens and the customer inserts the cased DVD through the second media return slot 33. Structure and operation of the bare DVD transporter 30 and the cased DVD transporter 32 are known and, therefore, will not be described further. Also, structure and operation of the first and second shutter doors 24, 26 of the first and second shutter mechanisms are known and, therefore, will not be described further.

Figure 3:
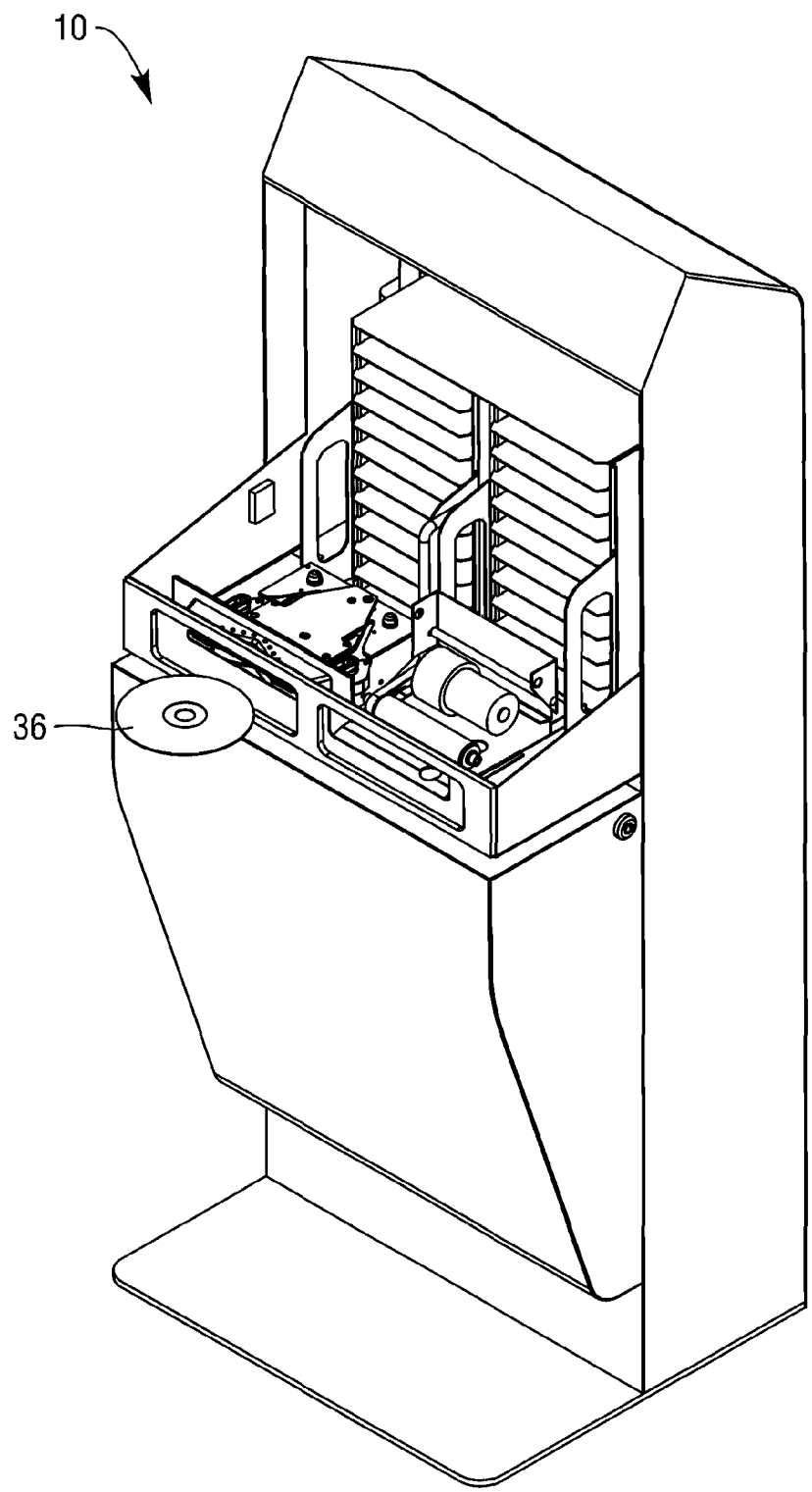
FIG. 3 is a perspective view similar to FIG. 2, and shows a bare DVD being inserted into a slot of a bare disc transporter.
Figure 4:
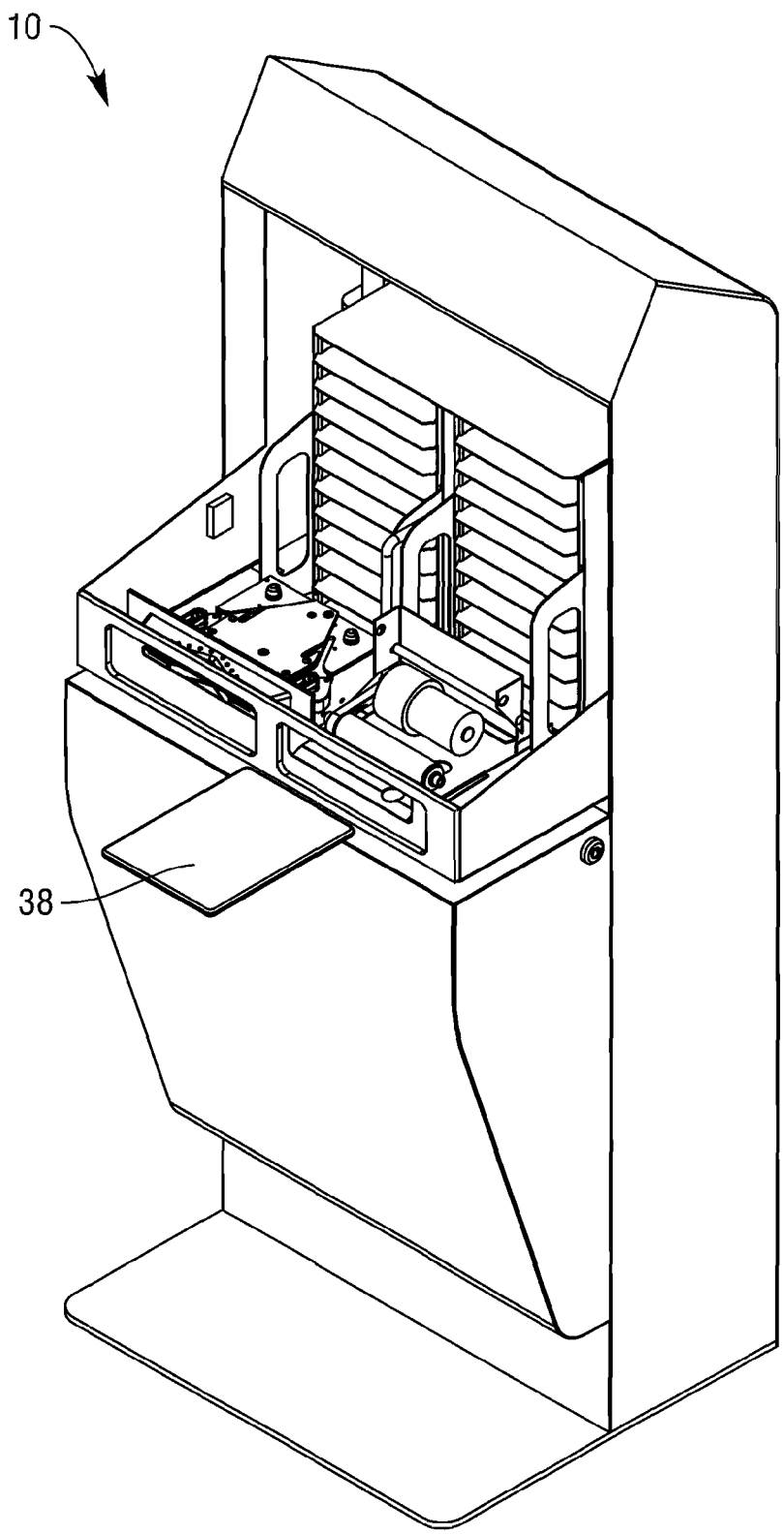
FIG. 4 is a perspective view similar to FIG. 3, and shows a cased DVD being inserted into a slot of a cased disc transporter.

A container 34 has a chamber in which a removable disc storage bin 40 is installed when the storage bin is in use in the terminal 10. The removable storage bin 40 includes a first bin portion 42 which is aligned with the bare DVD transporter 30 to receive bare DVDs to be returned through the bare DVD transporter. As shown in FIG. 3, a bare DVD 36 is shown aligned with the first media return slot 31 and is ready to be inserted through the slot into the bare DVD transporter 30 to return the bare DVD. The removable storage bin 40 also includes a second bin portion 44 which is aligned with the cased DVD transporter 32 to receive cased DVDs to be returned through the cased DVD transporter. As shown in FIG. 4, a cased DVD 38 is shown aligned with the second media return slot 33 and is ready to be inserted through the slot into the cased DVD transporter 32 to return the cased DVD. Each of the first and second bin portions 42, 44 has a linear array of shelves. The array of shelves of the first bin portion 42 and the array of shelves of the second bin portion 44 are substantially the same.

Figure 5:
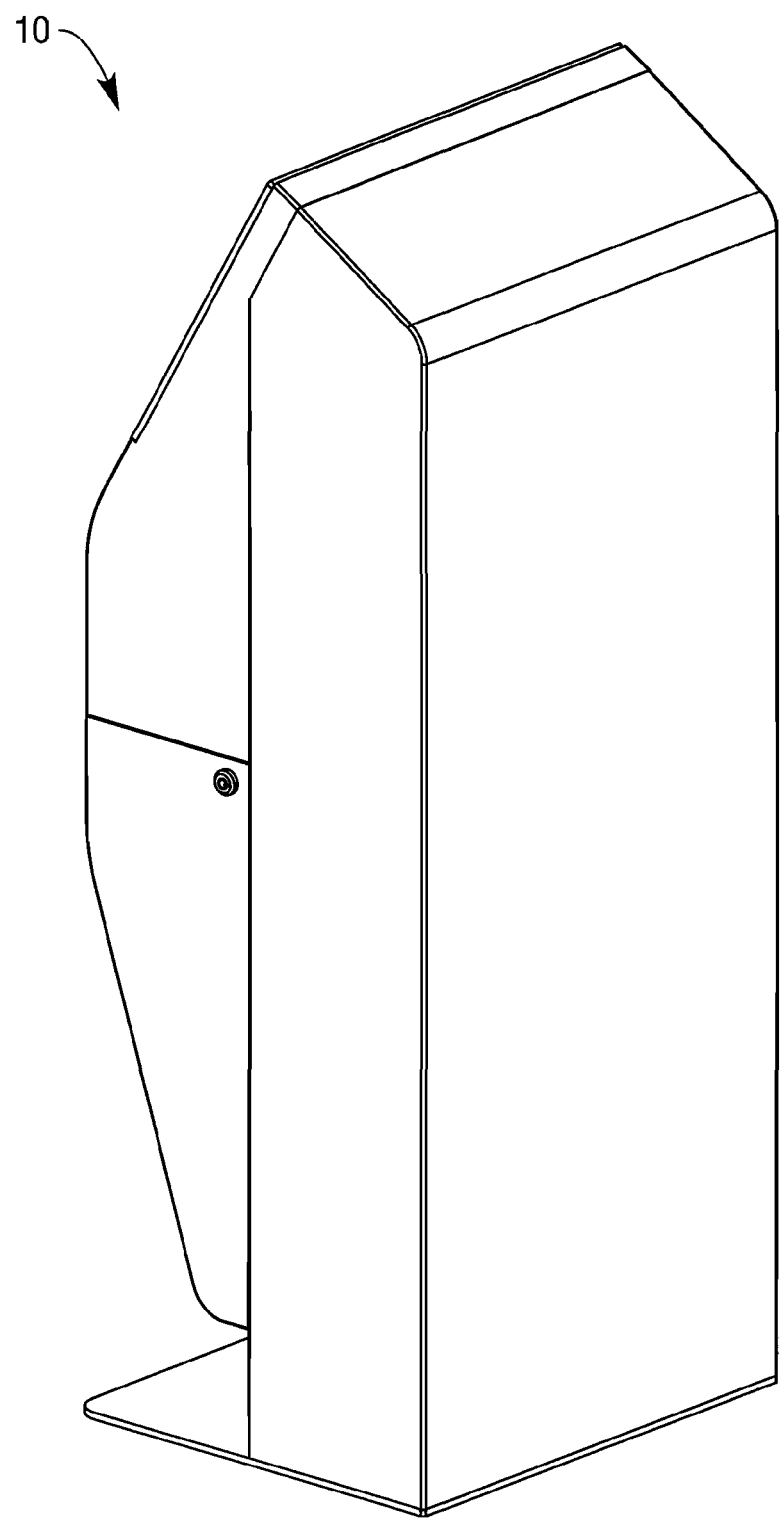
FIG. 5 is a perspective view, looking approximately in the direction of arrow "X" in FIG. 1, and showing a left-back perspective view of the dedicated self-service return terminal.
Figure 6:
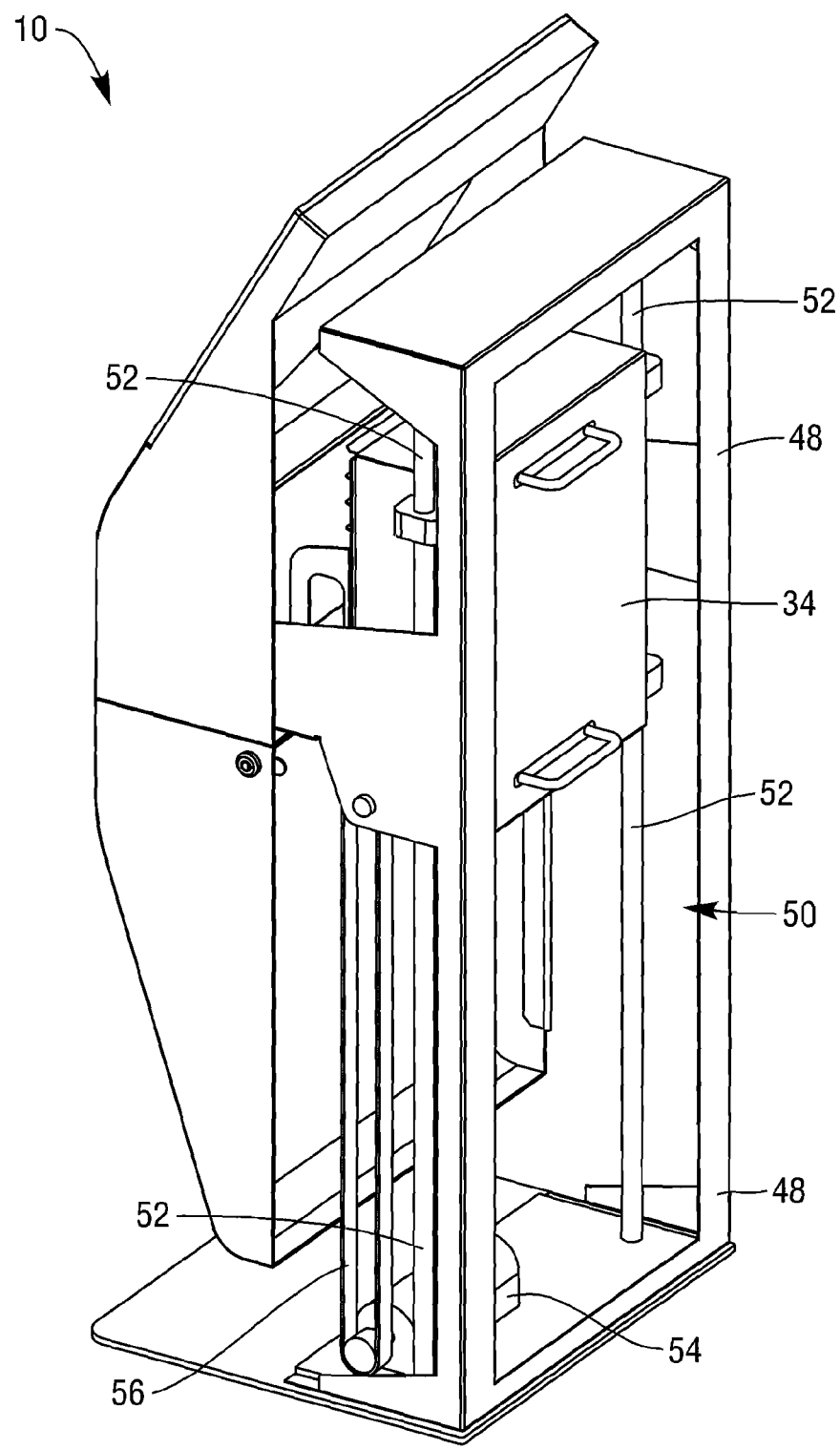
FIG. 6 is a perspective view similar to FIG. 5, and shows a number of panels removed to better illustrate a removable DVD cartridge bin.
Figure 7:
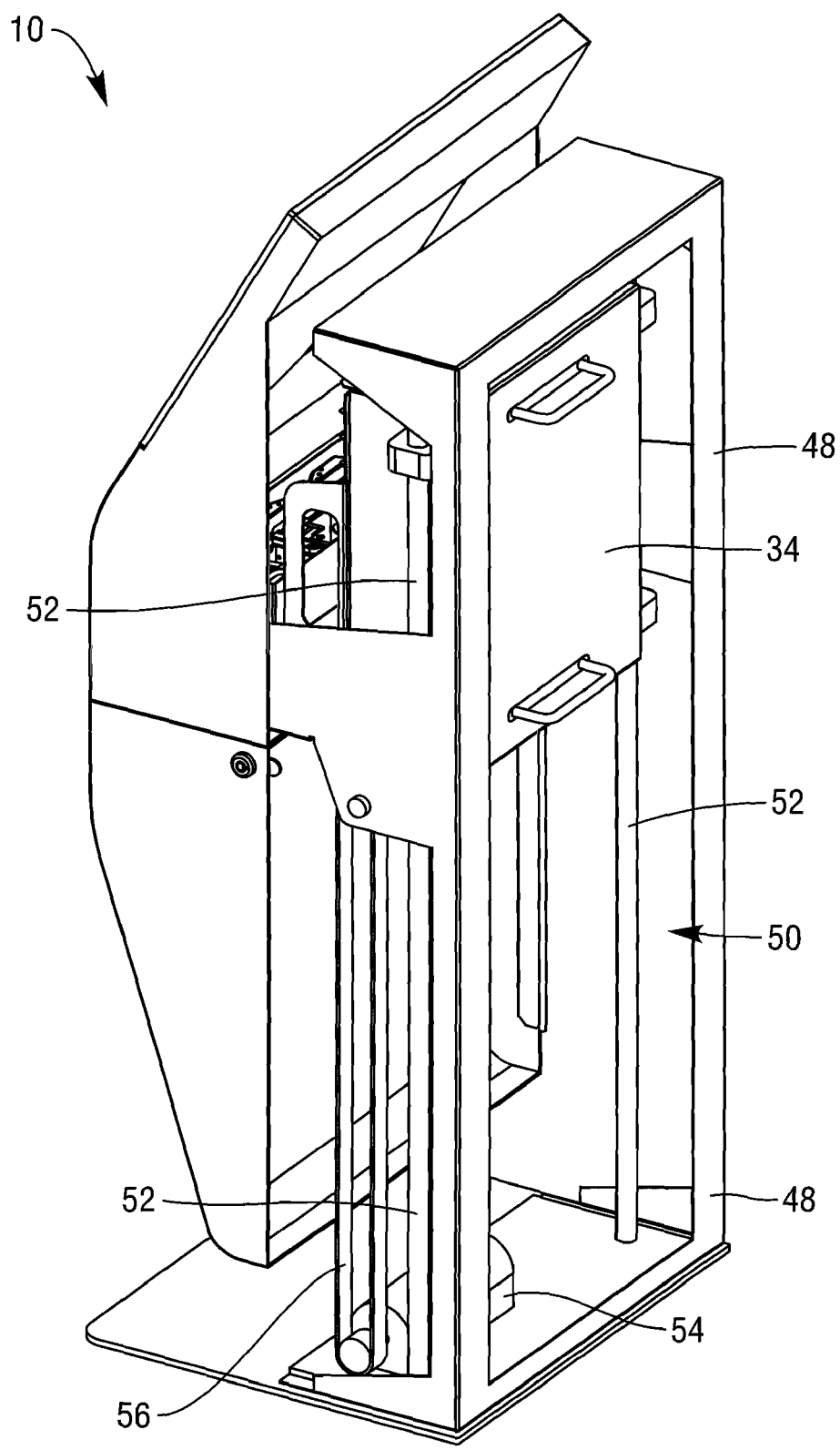
FIG. 7 is a perspective view similar to FIG. 6, and showing the removable DVD cartridge bin in another position.
Figure 8:
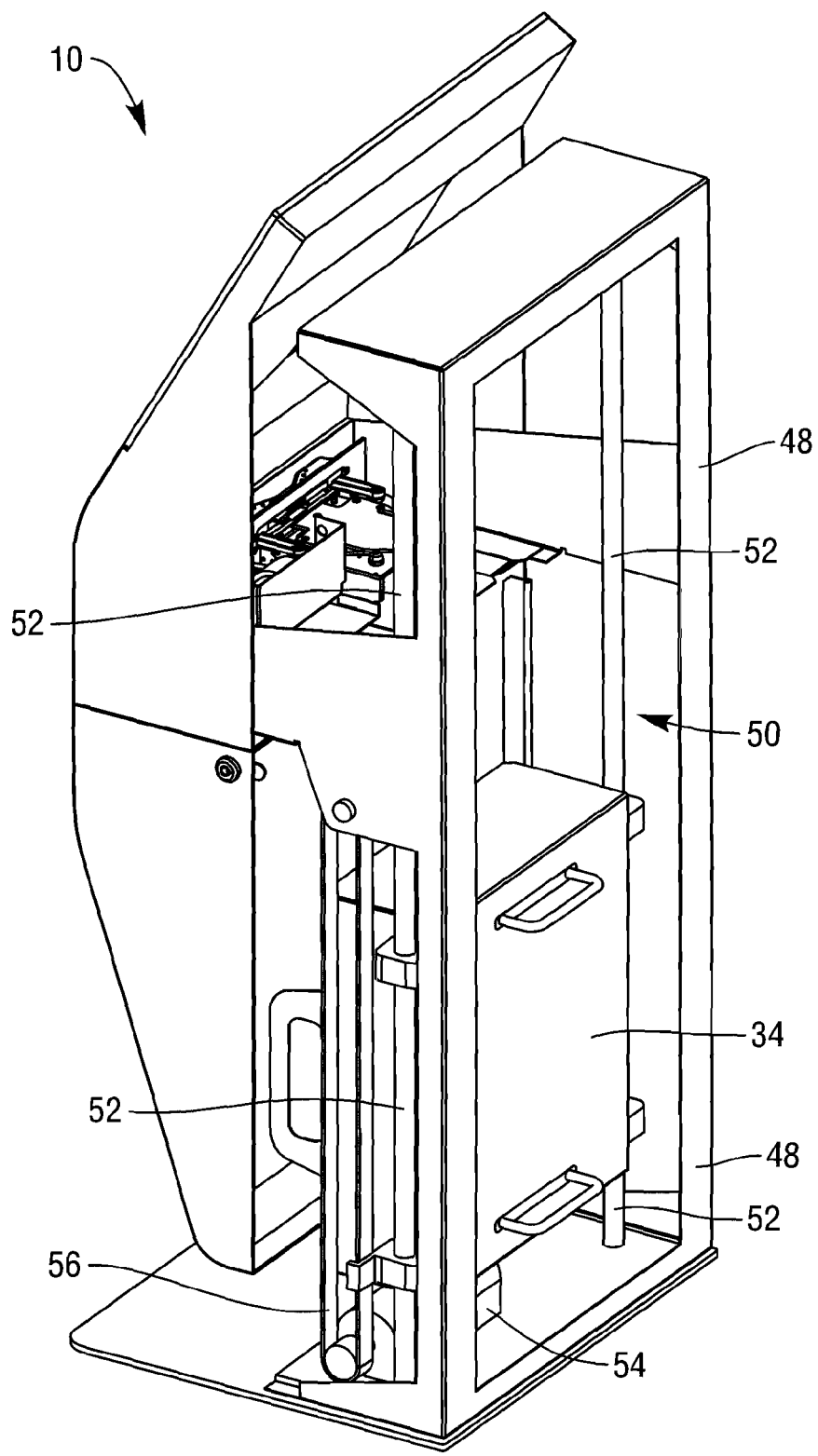
FIG. 8 is a perspective view similar to FIG. 8, and showing the removable DVD cartridge bin in yet another position.

FIG. 5 is a perspective view, looking approximately in the direction of arrow "X" in FIG. 1. More specifically, FIG. 5 shows a left-back perspective view of the dedicated self-service return terminal 10. FIG. 6 is a perspective view similar to FIG. 5, and shows the main panel 14 (FIG. 1) removed to better illustrate internal components of the dedicated self-service return terminal 10. As shown in FIG. 6, an internal frame 48 supports a sliding mechanism 50 which, in turn, supports the container 34 for vertically sliding movement between a topmost position (as shown in FIG. 7) and a bottommost position (as shown in FIG. 8). The container 34 is in a default and stowed position when it is in its bottommost position shown in FIG. 8. The container 34 shown in FIG. 6 is in some intermediate position between the topmost position of FIG. 7 and the bottommost position of FIG. 8. When the container 34 in an intermediate position (such as shown in FIG. 6) between its topmost and bottommost positions, the first and second bin portions 42, 44 of the storage bin 40 are in position for receiving either a returned bare DVD from the bare DVD transporter 30 or a returned cased DVD from the cased DVD transporter 32.

As shown in FIGS. 6-8, the sliding mechanism 50 comprises a pair of parallel rails 52 which extend vertically. One side of the container 34 is slidably coupled to one of the rails 52, and an opposite side of the container is slidably coupled to the other one of the rails. A direct current (DC) motor 54 is drivingly coupled through an endless continuous belt 56 to the container 34. The controller 35 controls the DC motor 54 in known manner to rotate in one direction to move the container 34 along the rails 52 towards the topmost position of the container (FIG. 7), and to rotate in the opposite direction to move the container along the rails 52 towards the bottommost position of the container (FIG. 8).

Figure 9:
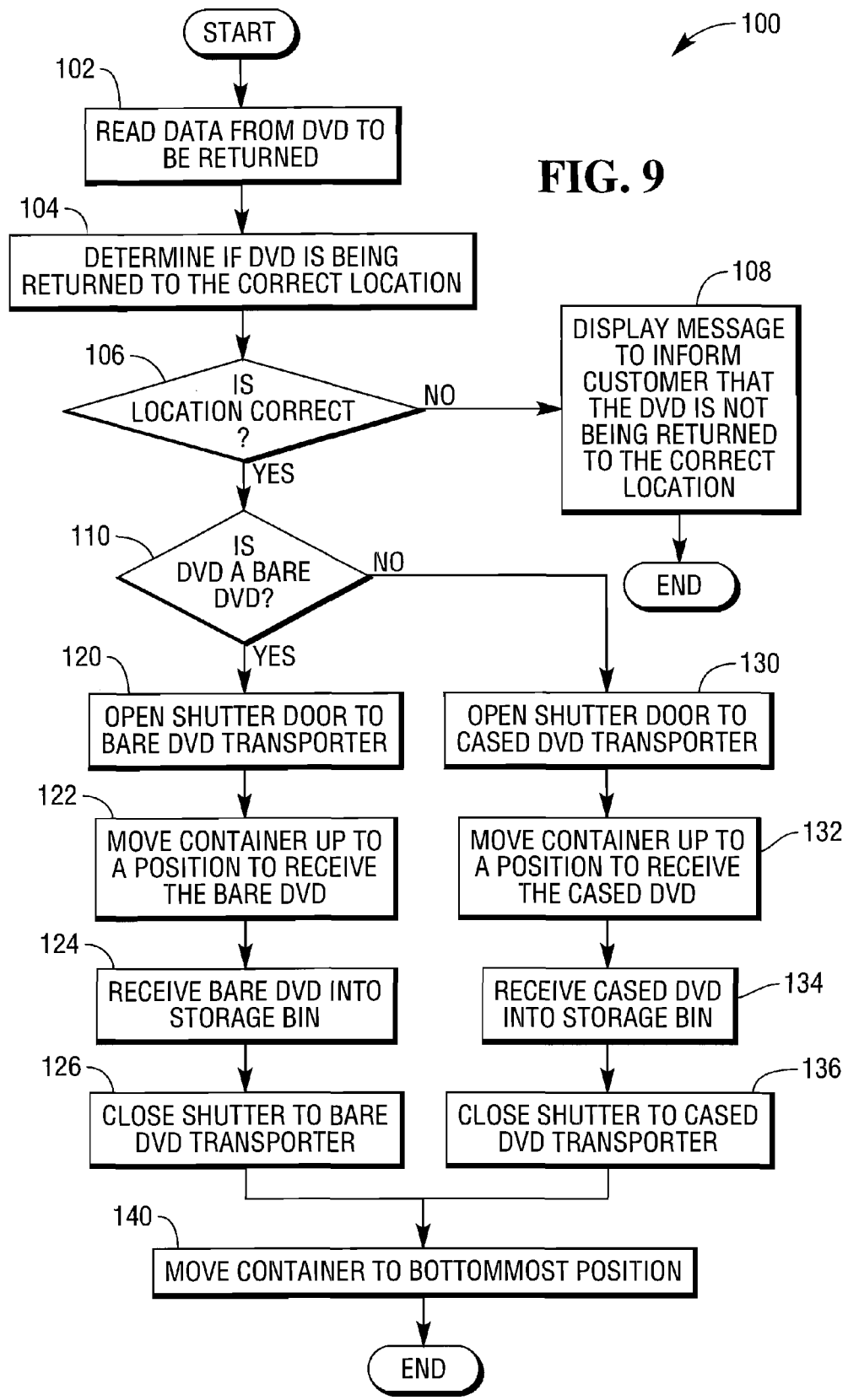
FIG. 9 is a flow diagram which depicts typical operation of the dedicated self-service return terminal of FIG. 1.

Referring to flow diagram 100 of FIG. 9, typical operation of the dedicated self-service return terminal 10 will now be described. The RFID reader 22 (FIG. 1) reads data from a DVD (bare or cased) intended to be returned by a customer arriving at the self-service return terminal 10 and "swiping" the DVD in front of the RFID reader (step 102). Based upon the data read from the DVD, the controller 35 (FIG. 2) makes a determination as to whether the DVD is being returned to the correct location (steps 104 and 106). If the determination is negative (i.e., the DVD is not being returned to the correct location), then a message is displayed on the display 20 to inform the customer that the DVD is not being returned to the correct location (step 108).

However, if the determination in step 106 is affirmative (i.e., the DVD is being returned the correct location), then a determination is made as to whether the DVD is a bare DVD (step 110). If the determination in step 110 is affirmative (i.e., the DVD being returned is a bare DVD), then the controller 35 controls the first shutter mechanism to move the first shutter door 24 from the closed position to the open position to allow the bare DVD to be inserted through the first media return slot 31 into the bare DVD transporter 30 (step 120). The controller 35 then controls the DC motor 54 to move the container 34 from the bottommost position (i.e., its stowed position) shown in FIG. 8 to a position such as shown in FIG. 6 so that the returned bare DVD can be received and stored in a shelf of the first bin portion 42 of the storage bin 40 (step 122). After the bare DVD is received and moved into the storage bin 40, the controller 35 controls the first shutter mechanism to close the first shutter door 24 (step 126). The controller 35 then controls the DC motor 54 to move the container 34 back to its stowed position shown in FIG. 8 (step 140).

However, if the determination in step 110 is negative (i.e., the DVD being returned is not a bare DVD), then it is assumed that the DVD being returned is a cased DVD. Under this assumption, the controller 35 controls the second shutter mechanism to move the second shutter door 26 from the closed position to the open position to allow the cased DVD to be inserted through the second media return slot 33 into the cased DVD transporter 32 (step 130). The controller 35 then controls the DC motor 54 to move the container 34 from the bottommost position shown in FIG. 8 to a position such as shown in FIG. 6 so that the returned cased DVD can be received and stored in a shelf of the second bin portion 42 of the storage bin 40 (step 132). After the cased DVD is received and moved into the storage bin 40, the controller 35 controls the second shutter mechanism to close the second shutter door 26 (step 136). The controller 35 then controls the DC motor 54 to move the container 34 back to its stowed position shown in FIG. 8 (step 140).

Figure 10:
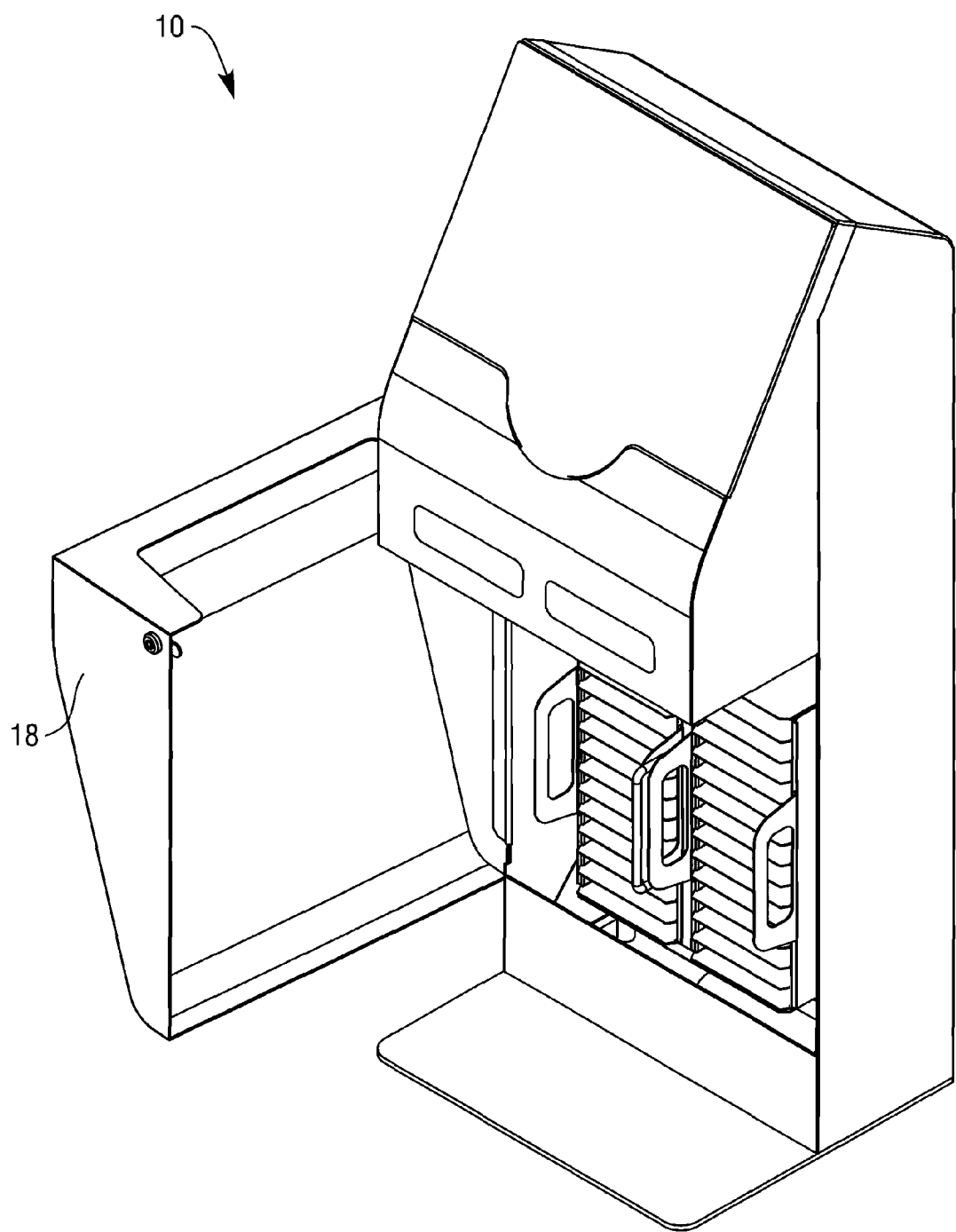
FIG. 10 is a perspective view similar to FIG. 1, and showing a lower access door of the dedicated self-service return terminal in an open position.
Figure 11:
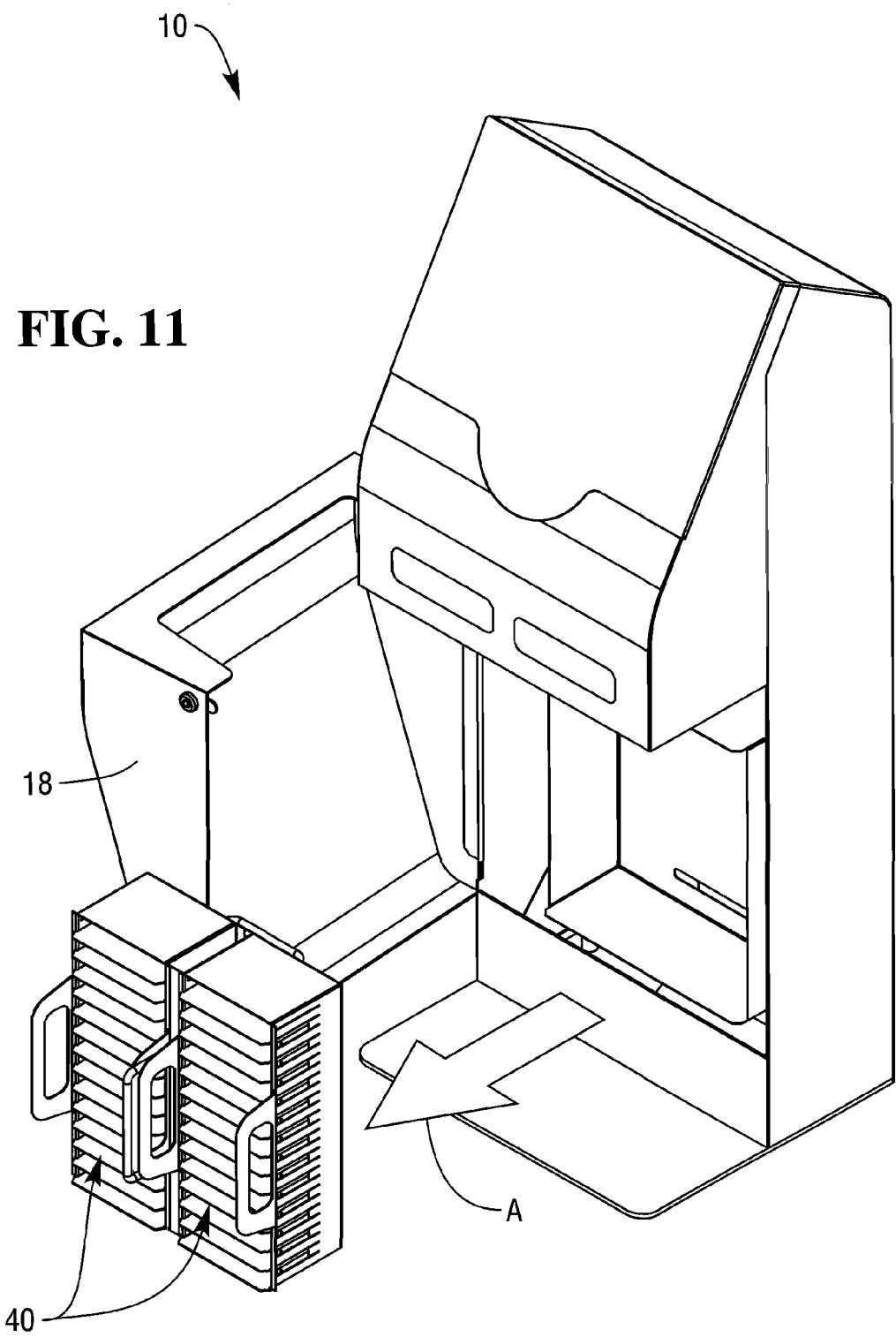
FIG. 11 is a perspective view similar to FIG. 10, and showing the removable DVD cartridge bin of FIG. 8 removed from the dedicated self-service return terminal.
Figure 12:
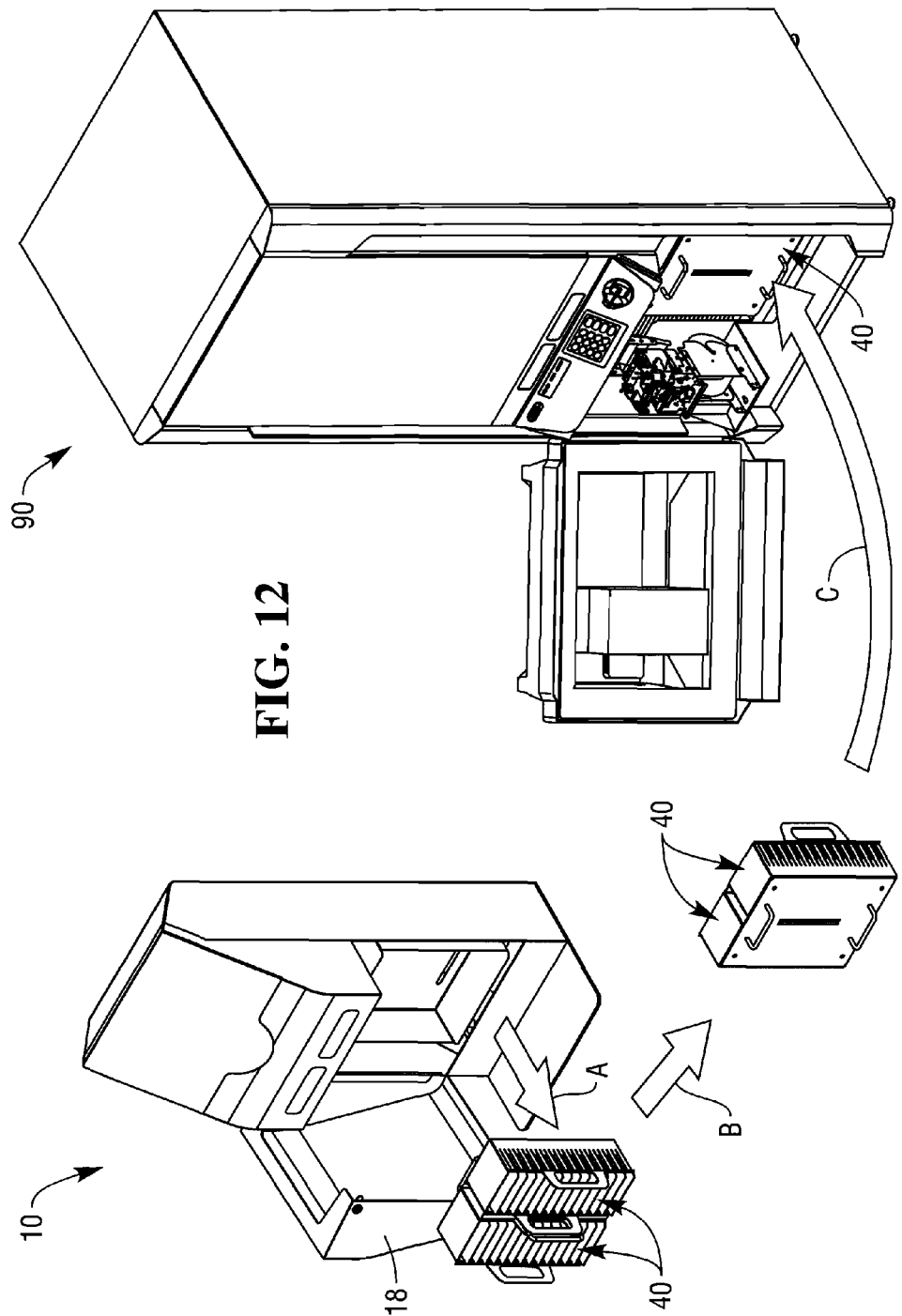
FIG. 12 is a perspective view of a system which pictorially illustrates how the DVD cartridge bin shown in FIG. 11 is moved from the dedicated self-service return terminal to a main self-service rental terminal which is associated with the dedicated self-service return terminal.

Referring to FIG. 10, the lower front access panel 18 is shown opened and the container 34 is in its stowed position. When the lower access panel 18 is open and the container 34 is in its stowed position, the storage bin 40 can be easily removed and uninstalled from the container, such as shown by arrow "A" in FIG. 11. As shown in FIG. 12, the removed storage bin 40 can then be rotated around (as depicted by arrow "B"), and then installed into a self-service rental terminal 90 (as depicted by arrow "C"). The self-service rental terminal 90 is a full-featured DVD rental terminal at which a customer can only rent DVDs (or possibly both rent and return DVDs). As shown in FIG. 12, the dedicated self-service rental terminal 10 and the full-featured self-service rental terminal 90 are separate and spaced apart from each other.

It should be apparent that the dedicated self-service return terminal 10 described hereinabove is conveniently provided for a customer who just wants to return a DVD. The customer who just wants to return a DVD need not have to wait in line with other customers who want to either rent or both rent and return DVDs at a full-featured self-service rental terminal such as shown in FIG. 12.

Also, it should be apparent that both the first and second shutter doors 24, 26 are maintained in their closed positions until only after the RFID reader 22 has verified the DVD is being returned to the correct location. This helps to keep a customer from returning a DVD to the wrong location. This also helps to keep non-customers from placing junk and trash into the slots of the bare DVD transporter 30 and the cased DVD transporter 32, and thereby vandalizing the terminal 10. Such a vandalized terminal may be unable to operate until a service person has been called and arrives at the terminal to clean out the junk and trash.

Further, it should be apparent that the bottommost position of the container 34 shown in FIG. 8 maintains the storage bin 40 at a relatively low center of gravity. This bottommost position also makes the storage bin 40 easily available for servicing when the lower front access panel 18 is opened. Although the above-description describes the bottommost position of the container 34 as being the default position of the storage bin 40, it is conceivable that a position which other than the bottommost position be the default position. It should also be apparent that the container 34 can be positioned at numerous intermediate positions between the topmost and bottommost positions. Typically, the number of different intermediate positions is directly related to the maximum number of shelves available each of the first and second bin portions 42, 44 of the storage bin 40.

It should also be apparent that design of the dedicated self-service return terminal 10 allows a relatively full storage bin 40 to be easily removed from the dedicated self-service return terminal 10 and then quickly moved to the full-featured self-service rental terminal 90 (FIG. 11), without having to empty contents of the full storage bin. This interchangeability feature of the removable storage bin 40 allows a service person to quickly and efficiently service both the dedicated self-service return terminal 10 and the full-featured self-service rental terminal 90.

The above-description describes one embodiment of the present invention. It is conceivable that the dedicated self-service return terminal may be any type of device in a publicly accessible, unattended environment. Dedicated self-service return terminals are generally public-access devices that are designed to allow a customer to return a media item (such as a bared DVD or a cased DVD) on which entertainment data is stored. Dedicated self-service return terminals typically include some form of tamper resistance so that they are inherently resilient. Dedicated self-service return terminals allow a customer to more quickly return a media item on which entertainment data is stored without having to wait in line with customers who want to rent (or both rent and return) media items on which entertainment data is stored.

Also, although the above-description describes entertainment media in the form of a DVD being returned, it is conceivable that other types of entertainment media may be returned. For example, the entertainment media may comprise a flash memory which stores entertainment data. As another example, the entertainment media may comprise optical media which is other than a DVD. Entertainment media may be of different technologies, different forms, or different sizes.

Further, although the above-description describes using a DC motor to effect movement of the removable disc storage bin between its top and bottom positions, it is conceivable that other types of motors or moving mechanisms may be used to effect movement of the removable disc storage bin.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An entertainment media rental and return system comprising:
   a rental terminal at which a customer can either rent entertainment media or return entertainment media which has been previously rented from the rental terminal including a container;
   a return terminal at which a customer can only return entertainment media which has been previously rented from the rental terminal including a container similar in construction to the container of the rental terminal; and
   a removable storage bin interchangeable between the container of the rental terminal and the container of the return terminal and arranged to (i) receive entertainment media which has been returned by a customer at the return terminal when the bin is installed in the return terminal, (ii) receive entertainment media which has been returned by a customer at the rental terminal when the bin is installed in the rental terminal, and (iii) provide entertainment media which is available to be rented to a customer at the rental terminal when the bin is installed in the rental terminal;
   wherein (i) the removable storage bin includes a first linear array of shelves and a second linear array of shelves adjoining the first linear array of shelves, and (ii) the first linear array of shelves are positioned to receive bare entertainment media and the second linear array of shelves are positioned to received cased entertainment media when the storage bin is installed in the second container of the return terminal.

2. An entertainment media rental and return system according to claim 1, wherein (i) the rental terminal includes an exterior enclosure, and (ii) the return terminal includes an exterior enclosure which is separate from the exterior enclosure of the rental terminal.

3. An entertainment media rental and return system according to claim 2, wherein the exterior enclosure of the rental terminal and the exterior enclosure of the return enclosure are spaced apart from each other.

4. A removable storage bin interchangeable between a rental terminal at which a customer can either rent entertainment media or return entertainment media which has been previously rented from the rental terminal and a return terminal at which a customer can only return entertainment media which has been previously rented from the rental terminal, the removable storage bin comprising:
- a first linear array of shelves for receiving bare entertainment media which has been returned at the return terminal when the storage bin is installed at the return terminal; and
- a second linear array of shelves adjoining the first linear array of shelves and for receiving cased entertainment media which has been returned at the return terminal when the storage bin is installed at the return terminal.

5. A removable storage bin according to claim 4, wherein construction of the first and second linear arrays of shelves is substantially the same.

* * * * *